US012792924B2

(12) United States Patent
Donato et al.

(10) Patent No.: US 12,792,924 B2
(45) Date of Patent: Nov. 10, 2026

(54) TRAINING NEURAL NETWORKS THROUGH REINFORCEMENT LEARNING USING STANDARDIZED ABSOLUTE DEVIATIONS

(71) Applicant: GDM Holding LLC, Mountain View, CA (US)

(72) Inventors: Domenic Joseph Donato, Oviedo, FL (US); Christopher James Dyer, London (GB); Lei Yu, Oxford (GB); Wang Ling, Lisbon (PT)

(73) Assignee: GDM Holding LLC, Mountain View, CA (US)

( * ) Notice: Subject to any disclaimer, the term of this patent is extended or adjusted under 35 U.S.C. 154(b) by 386 days.

(21) Appl. No.: 18/388,180

(22) Filed: Nov. 8, 2023

(65) Prior Publication Data

US 2024/0169211 A1 May 23, 2024

Related U.S. Application Data

(60) Provisional application No. 63/425,979, filed on Nov. 16, 2022.

(51) Int. Cl.
*G06N 3/092* (2023.01)
*G06N 3/0985* (2023.01)

(52) U.S. Cl.
CPC ........... *G06N 3/092* (2023.01); *G06N 3/0985* (2023.01)

(58) Field of Classification Search
CPC ............................. G06N 3/092; G06N 3/0985
USPC ........................................................... 706/15
See application file for complete search history.

(56) References Cited

U.S. PATENT DOCUMENTS

2019/0258918 A1* 8/2019 Wang ..................... G06N 3/045
2021/0236053 A1* 8/2021 Narayan ................ A61B 5/363
2022/0121884 A1* 4/2022 Zadeh .................... G06N 3/006

OTHER PUBLICATIONS

Byyd et al., “What is the effect of importance weighting in deep learning”, Proceedings of the 36th international conference on machine learning, Long Beach, California, PMIR 97, 2019 (Year: 2019).*
Song et al., “Reward based training of recurrent neural networks for cognitive and value-base tasks”, eLife 2017; 6: e21492, 2017 (Year: 2017).*
Bahdanau et al., “An actor-critic algorithm for sequence prediction,” CoRR, submitted on Mar. 3, 2017, arXiv:1607.07086v3, 17 pages.
Cassirer et al., “Reverb: A framework for experience replay,”CoRR, submitted on Feb. 9, 2021, arXiv:2102.04736v1, 11 pages.
Chiang et al., “Hope and fear for discriminative training of statistical translation models,” Journal of Machine Learning Research, Apr. 1, 2012, 13(40):1159-1187.
Choshen et al., “On the weaknesses of reinforcement learning for neural machine translation,” CoRR, submitted on Jan. 15, 2020, arXiv:1907.01752v4, 12 pages.

(Continued)

*Primary Examiner* — Tsu-Chang Lee
(74) *Attorney, Agent, or Firm* — Fish & Richardson P.C.

(57) ABSTRACT

Methods, systems, and apparatus, including computer programs encoded on a computer storage medium, for training a neural network to perform a machine learning task through reinforcement learning. In one aspect, the training uses importance weights generated using standardized absolute deviations of quality scores generated by the neural network for candidate network outputs.

20 Claims, 3 Drawing Sheets

(56) References Cited

OTHER PUBLICATIONS

Christiano et al., "Deep reinforcement learning from human preferences," In Advances in Neural Information Processing Systems, 2017, 9 pages.
Cortes et al., "Learning bounds for importance weighting," In Advances in Neural Information Processing Systems, 2010, 9 pages.
Edunov et al., "Classical structured prediction losses for sequence to sequence learning," CoRR, submitted on Mar. 7, 2018, arXiv:1711.04956v2, 10 pages.
Hopkins et al., "Tuning as ranking," In Proceedings of the 2011 Conference on Empirical Methods in Natural Language Processing, Jul. 2011, p. 1352-1362.
Kiegeland et al., "Revisiting the weaknesses of reinforcement learning for neural machine translation," CoRR, submitted on Jun. 16, 2021, arXiv:2106.08942v1, 9 pages.
Kreutzer et al., "Bandit structured prediction for neural sequence-to-sequence learning," CoRR, submitted on Dec. 13, 2018, arXiv:1704.06497v2, 11 pages.
Kudo et al., "SentencePiece: A simple and language independent subword tokenizer and detokenizer for neural text processing," CoRR, submitted on Aug. 19, 2018, arXiv:1808.06226v1, 6 pages.
Kudo, "Subword regularization: Improving neural network translation models with multiple subword candidates," CoRR, submitted on Apr. 29, 2018, arXiv:1804.10959v1, 10 pages.
Liang et al., "An end-to-end discriminative approach to machine translation," In Proceedings of the 21st International Conference on Computational Linguistics and 44th Annual Meeting of the Association for Computational Linguistics, Jul. 2006, p. 761-768.
Meister et al., "If beam search is the answer, what was the question?" CoRR, submitted on Jan. 17, 2021, arXiv:2010.02650v2, 13 pages.
Mutton et al., "Gleu: Automatic evaluation of sentence-level fluency," In Proceedings of the 45th Annual Meeting of the Association of Computational Linguistics, Jun. 2007, p. 344-351.
Nguyen et al., "Reinforcement learning for bandit neural machine translation with simulated human feedback," CoRR, submitted on Nov. 11, 2017, arXiv:1707.07402v4, 12 pages.
Papineni et al., "Bleu: a method for automatic evaluation of machine translation," In Proceedings of the 40th annual meeting of the Association for Computational Linguistics, Jul. 2002, p. 311-318.
Papini et al., "Balancing learning speed and stability in policy gradient via adaptive exploration," In International conference on artificial intelligence and statistics, Jun. 3, 2020, p. 1188-1199.
Paulus et al., "A deep reinforced model for abstractive summarization," CoRR, submitted on Nov. 13, 2017, arXiv:1705.04304v3, 12 pages.
Popovic et al., "chrF: character n-gram F-score for automatic MT evaluation," In Proceedings of the Tenth Workshop on Statistical Machine Translation, Sep. 2015, p. 392-395.
Post, "A call for clarity in reporting Bleu scores," CoRR, submitted on Sep. 12, 2018, arXiv:1804.08771v2, 6 pages.
Precup, "Eligibility traces for off-policy policy evaluation," In Proceedings of the Seventeenth International Conference on Machine Learning, 2000, p. 759-766.
Ranzato et al., "Sequence level training with recurrent neural networks," CoRR, submitted on May 6, 2016, arXiv:1511.06732v7, 16 pages.
Rennie et al., "Self-critical sequence training for image captioning," In 2017 IEEE Conference on Computer Vision and Pattern Recognition (CVPR), 2017, p. 1179-1195.
Schulman et al., "Proximal policy optimization algorithms," CoRR, submitted on Aug. 28, 2017, arXiv:1707.06347v2, 12 pages.
Sellam et al., "BleuRT: Learning robust metrics for text generation," CoRR, submitted on May 21, 2020, arXiv:2004.04696v5, 12 pages.
Shen et al., "Minimum risk training for neural machine translation," CoRR, submitted on Jun. 15, 2016, arXiv:1512.02433v3, 10 pages.
Snover et al., "A study of translation edit rate with targeted human annotation," In Proceedings of the 7th Conference of the Association for Machine Translation in the Americas: Technical Papers, 2006, p. 223-231.
Stiennon et al., "Learning to summarize with human feedback," CoRR, submitted on Feb. 15, 2022, arXiv:2009.01325v3, 45 pages.
Vaswani et al., "Attention is all you need," 31st Conference on Neural Information Processing Systems, Jan. 10, 2013, 11 pages.
Weaver et al., "The optimal reward baseline for gradient-based reinforcement learning," In Proceedings of the Seventeenth Conference on Uncertainty in Artificial Intelligence, Aug. 2, 2001, p. 538-545.
Williams, "Simple statistical gradient-following algorithms for connectionist reinforcement learning," Machine Learning, May 1992, 8(3):229-256.
Wu et al., "A study of reinforcement learning for neural machine translation," CoRR, submitted on Aug. 27, 2018, arXiv:1808.08866v1, 10 pages.
Yang et al., "Launchpad: A programming model for distributed machine learning research," CoRR, submitted on Jun. 7, 2021, arXiv:2106.04516v1, 18 pages.
Ziegler et al., "Fine-tuning language models from human preferences," CoRR, submitted on Jan. 8, 2020, arXiv:1909.08593v2, 26 pages.

* cited by examiner

TRAINING NEURAL NETWORKS THROUGH REINFORCEMENT LEARNING USING STANDARDIZED ABSOLUTE DEVIATIONS

CROSS-REFERENCE TO RELATED APPLICATION

This application claims priority to U.S. Provisional Application No. 63/425,979, filed on Nov. 16, 2022. The disclosure of the prior application is considered part of and is incorporated by reference in the disclosure of this application.

BACKGROUND

This specification relates to performing a machine learning task on a network input using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a neural network on training examples to perform a machine learning task using reinforcement learning. Each training example includes (i) a network input from a set of training data, (ii) a candidate network output for the network input generated using the neural network, and (iii) a reward value that characterizes the similarity of the candidate network output to a target network output for the network input in the training example.

In particular, during the training, the system computes, for each training example, a respective importance weight and uses the importance weight to determine how strongly the training example should impact the training of the neural network.

The system computes the importance weight using an importance weight factor that is derived from (i) a likelihood score assigned to the candidate network output in the given training example when the given training example was generated and (ii) likelihood scores assigned to multiple other candidate network outputs for the same network input as in the given training example.

Particular embodiments of the subject matter described in this specification can be implemented so as to realize one or more of the following advantages.

Using techniques described in this specification, the system can train a neural network through reinforcement learning with increased training stability and improved generalization performance relative to other reinforcement learning training schemes. In particular, the techniques described in this specification decrease the variance of the training process while encouraging exploration throughout training, resulting in improved training stability and improved generalization after training. More specifically, the system can use conditional reward normalization to ensure that each network input has diverse candidate network outputs, can use a robust importance weighting scheme to act as a conditional entropy regularizer during training, or both.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
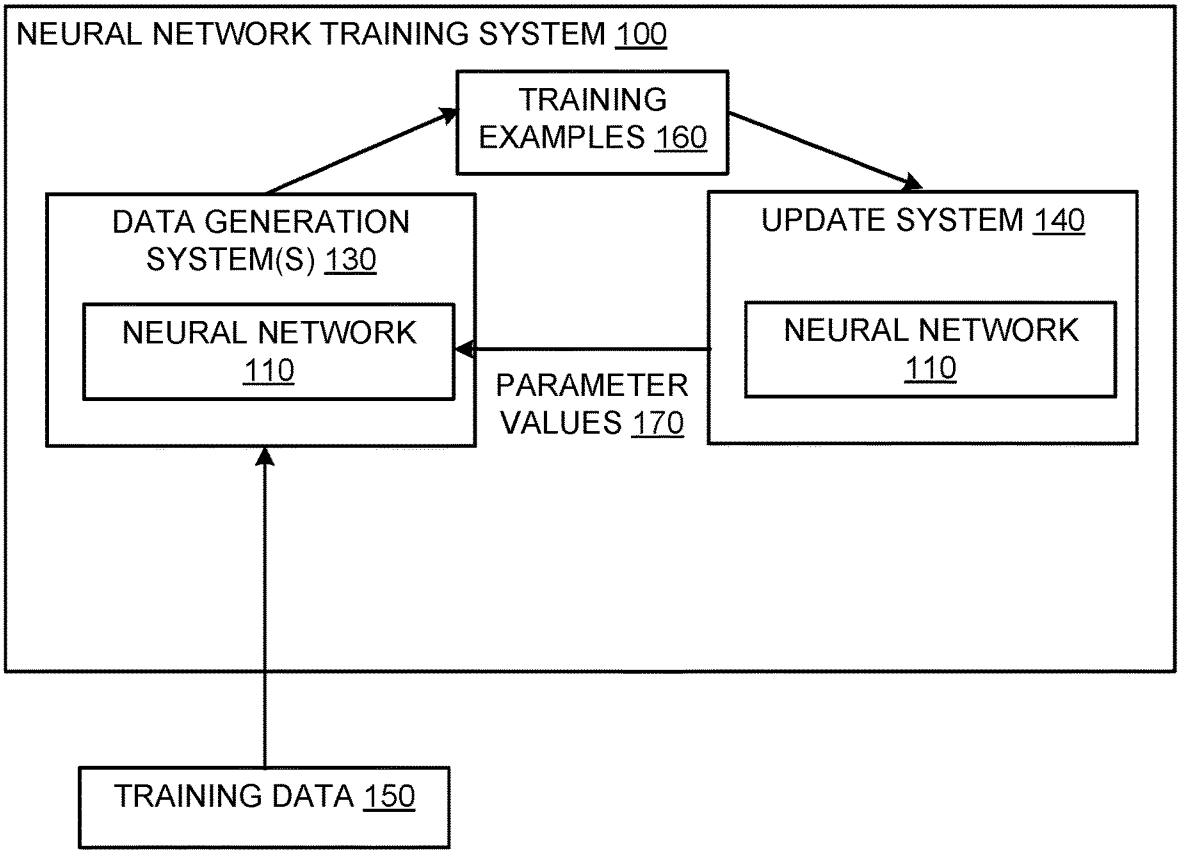
FIG. 1 shows an example neural network training system.

This specification describes a system implemented as computer programs on one or more computers in one or more locations that trains a neural network to perform a machine learning task on a network input to generate a network output for the machine learning task.

The neural network can be trained to perform any kind of machine learning task, i.e., can be configured to receive any kind of digital data input and to generate any kind of score, classification, or regression output based on the input.

More specifically, the neural network can be configured to perform any kind of machine learning task (i) in which the neural network generates a prediction (or a sequence of predictions) conditioned on some network input and (ii) that has an associated reward function that maps the prediction or sequence of predictions to a reward value that represents the quality of the prediction or sequence of predictions, e.g., relative to a ground truth output for the network input.

In some cases, the neural network is a neural network that is configured to perform an image processing task, i.e., receive an input image and to process the input image, i.e., to process intensity values of the pixels of the image, to generate a network output for the input image. For example, the task may be image classification and the output generated by the neural network for a given image may be scores for each of a set of object categories, with each score representing an estimated likelihood that the image contains an image of an object belonging to the category. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, the task can be a machine translation task, where, if the input to the neural network is a sequence of text in one language, the output generated by the neural network may be a sequence of text in another language that is a translation of the input text into the other language.

More generally, the task can be any task generation task that requires generating natural language text, computer program code, or other text conditioned on a network input, e.g., a task that requires text that answers the network input, that completes the network input, that follows the network input, or that summarizes the network input.

As another example, the task may be an audio data processing task. An audio data input to the neural network may comprise a representation of a digitized audio waveform, e.g., a speech waveform. Such a representation may comprise samples representing digitized amplitude values of the waveform or, e.g., a time-frequency domain representation of the waveform. As one example of an audio processing task, if the input to the neural network is a sequence representing a spoken utterance, the output generated by the neural network may be text that is a transcript for the utterance. As another example, the task may be a keyword spotting task where, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

Example reward functions that can be associated with machine learning tasks are described below.

FIG. 1 shows an example neural network training system 100. The neural network training system 100 is an example of a system implemented as computer programs on one or more computers in one or more locations, in which the systems, components, and techniques described below can be implemented.

The system 100 is a system that trains a neural network 110 that has parameters ("network parameters") and that is configured to process a network input in accordance with the network parameters to generate a network output characterizing the network input 102 for a machine learning task. For example, the network parameters can include the weights and, optionally, biases of the layers of the neural network.

The neural network 110 can have any appropriate architecture that allows the neural network to map network inputs of the type required for the machine learning task to network outputs of the type required for the machine learning task. For example, the neural network 110 can be an encoder-decoder Transformer, an encoder-only Transformer, a decoder-only Transformer, a convolutional neural network, a recurrent neural network, and so on.

In some cases, the network output includes a single token, e.g., a single text token, a single classification output identifying a classification category, or a single set of numerical values. In other cases, the network output includes a sequence of tokens. In these cases, the neural network can be configured to generate the sequence auto-regressively or in parallel.

In particular, the system 100 trains the neural network 110 through reinforcement learning, i.e., to minimize a reinforcement learning loss function, using a set of training data 150. The set of training data includes multiple training network inputs and, for each training network input, a respective target network output. The target network output is a "ground truth" output for the network input for the machine learning task, i.e., the output that should be generated by performing the machine learning task on the network input.

Optionally, prior to training the neural network 110 through reinforcement learning, the system 100 or a different training system can pre-train the neural network 110 on a second set of training data using supervised learning, unsupervised learning, or a combination of both supervised and unsupervised learning. That is, the system 100 can start training the neural network 110 from pre-trained values of the network parameters of the neural network 110 that have been determined as a result of the pre-training. The second set of training data can be the same training data as the training data 150 or a different set of training data. As a particular example, the system 100 can first pre-train the neural network through supervised learning, e.g., to minimize an appropriate supervised loss function for the machine learning task, and then "fine-tune" the neural network through reinforcement learning to improve the performance of the neural network, e.g., to improve how well the neural network generalizes to inputs that are not present in the training data.

In order to train the neural network 110, the system 100 includes one or more data generation systems 130 and an update system 140.

At a high level, during the training, the data generation system(s) 130 repeatedly generate training examples 160 for training the neural network 110 and the update system 140 repeatedly samples from the generated training examples 160 and uses the sampled training examples 160 to update the values of the network parameters of the neural network 110.

Each training example 160 includes (i) a network input from the training data 150, (ii) a candidate network output for the network input generated using the neural network 110, and (iii) a reward value that characterizes the similarity of the candidate network output to the target network output for the network input in the training example.

When the system 100 includes multiple data generation systems 130, the system 100 can train the neural network 110 in a distributed manner. In particular, the multiple data generation systems 130 can operate asynchronously and in parallel to generate training examples 160 and can store the generated training examples 160 in a memory that is accessible by the update system 140.

The update system 140 can sample training examples 160 from the memory and use the training examples to update values of the network parameters through reinforcement learning. At intervals during the training, e.g., after every N times that the update system 140 updates the network parameter values, where N is an integer greater than or equal to one, the update system 140 can provide the current values 170 of the network parameters to the data generation systems 130 for use in generating training examples 160.

More specifically, prior to updating the parameter values using any given training example 160, the update system 140 computes an importance weight for the training example 160 and uses the importance weight to determine how strongly to weight the update that is computed using the given training example 160.

Unlike conventional importance weighting schemes, the update system 140 computes the importance weight using an importance weight factor that is derived from (i) a likelihood score assigned to the candidate network output in the given training example when the given training example was generated and (ii) likelihood scores assigned to multiple other candidate network outputs for the same network input as in the given training example. Computing importance weights using this factor allows the update system 140 to focus learning effort on candidate network outputs that are "in reach" of the current policy, i.e., of the neural network 110 given the current values of the network parameters when the training example is generated, but that are not at the current policy's mode. This can mitigate issues that result from the reinforcement learning training causing the policy to become more peaked during training, decreasing sampling diversity. For example, this can prevent the amount of exploration performed by the neural network 110 from being undesirably reduced as training progresses. As a result, the trained neural network 110 can end up generalizing better to previously unseen network inputs.

Generating training examples and computing the described importance weight factor are described below with reference to FIG. 2.

Updating the values of the network parameters using the importance weight factor and the reward values are described below with reference to FIG. 3.

After training the neural network 110 through reinforcement learning, the system 100 or a different inference system can use the trained neural network 110 to perform the machine learning task. For example, the inference system can receive a new network input and then process the new network input using the trained neural network 110 to generate a new network output for the new network input for the machine learning task.

As another example, instead of or in addition to using the trained neural network 110 to perform the machine learning task, the system 100 can provide the trained values of the network parameters determined as a result of the training to another inference system for use in performing the machine learning task.

Figure 2:
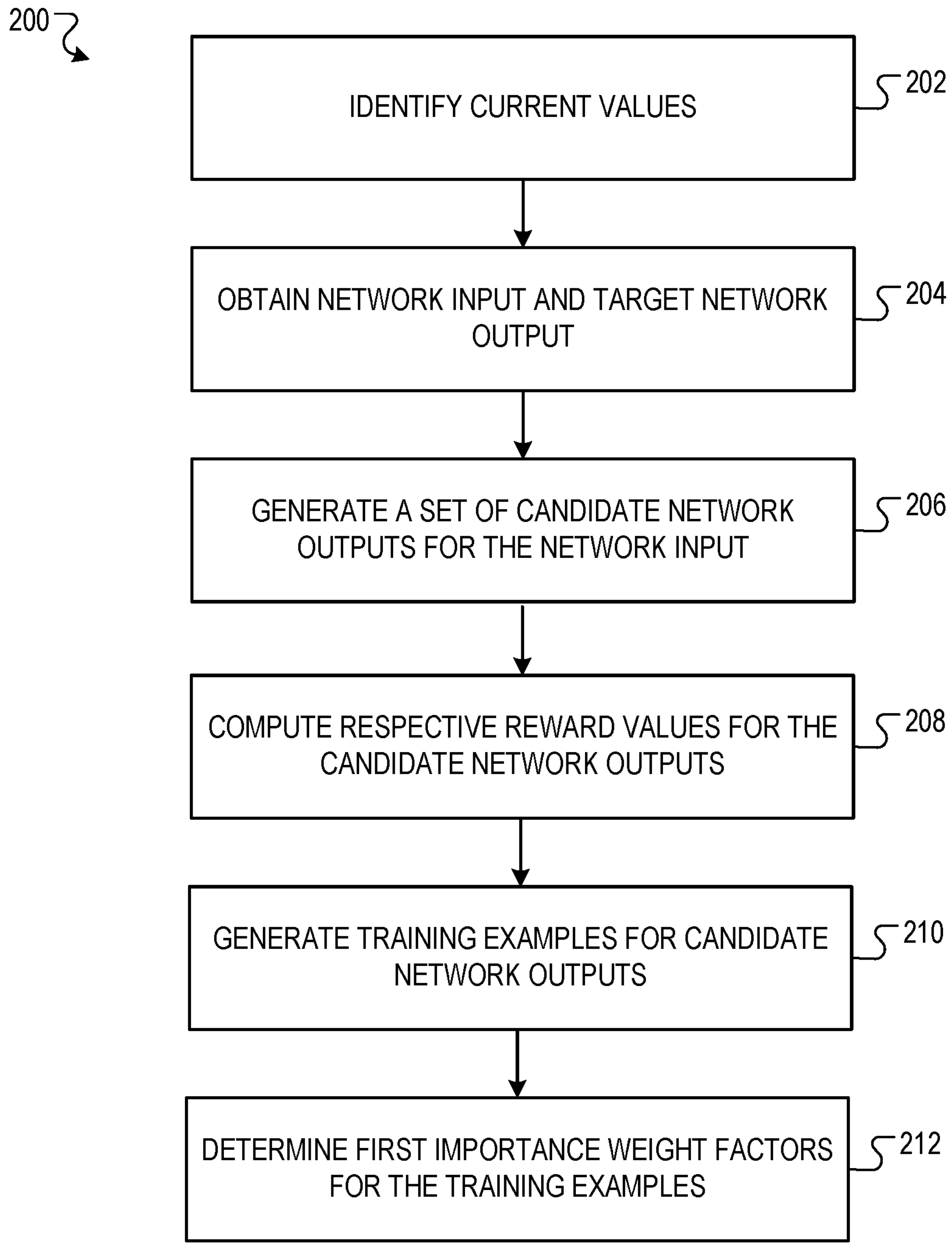
FIG. 2 is a flow diagram of an example process for generating training examples.

FIG. 2 is a flow diagram of an example process 200 for generating a set of training examples for training the neural network. For convenience, the process 200 will be described as being performed by a system of one or more computers located in one or more locations. For example, a data generation system included in a training system, e.g., one of the data generation systems 130 included in the training system 100 of FIG. 1, appropriately programmed, can perform the process 200.

The system can repeatedly perform iterations of the process 200 to generate training data for training the neural network. For example, when the training system trains the neural network in a distributed manner, each data generation system within the training system can repeatedly and asynchronously perform iterations of the process 200 during the training of the neural network through reinforcement learning.

The system identifies current values of the parameters of the neural network (step 202) as of the current iteration of the process 200. For example, when the training system trains the neural network in a distributed manner, each data generation system within the training system can periodically obtain parameter values from the update system within the training system. The data generation system can then use the most-recently obtained parameter values as the current values until updated values are received from the update system.

The system obtains a network input and a target network output for the network input (step 204). The target network output is a "ground truth" output for the machine learning task that should be generated by the neural network by processing the network input. For example, the system can sample the network input from a set of training data, e.g., randomly or in accordance with a prioritized sampling scheme.

The system processes the network input using the neural network in accordance with the current values of the network parameters to generate a set of candidate network outputs for the network input (step 206).

In particular, the system can process the same network input through the neural network and in accordance with the current values of the network parameters multiple times to generate multiple initial candidate network outputs for the network input. The system can then generate the set of candidate network outputs by removing, from the multiple initial candidate network outputs, any duplicate outputs, i.e., any initial candidate network outputs that are the same as another one of the candidate network outputs.

In some implementations, the system can generate a fixed number of multiple initial candidate network outputs. In some other implementations, the system can continue generating initial candidate network outputs until the set of candidate network outputs includes a fixed number of network outputs.

Generally, processing the same network input multiple times can result in different network outputs because the system samples each token in the network output from a corresponding probability distribution that is generated by the neural network. To generate the probability distribution for a given token, the neural network maps an intermediate output corresponding to the given token and generated by the neural network to the probability distribution using a softmax operation in accordance with a temperature hyperparameter for the softmax operation. For example, the intermediate output can be a set of logits, one for each possible token in a vocabulary of tokens. That is, the penultimate layer of the neural network generates the intermediate output and a softmax layer maps the intermediate output to the probability distribution in accordance with the temperature hyperparameter. For example, when there are N tokens in the vocabulary and, therefore, N logits, the softmax layer can generate the probability for the i-th token as:

$$\frac{e^{s_i/\tau}}{\sum_{j=1}^{N} e^{s_j/\tau}},$$

where $s_i$ is the logit for the i-th token and $\tau$ is the temperature hyperparameter.

This sampling introduces stochasticity into the output generation and can result in different network outputs being generated for the same network input.

In some implementations, in order to increase the diversity of the candidate network outputs, the system can use different values for the temperature hyperparameter when generating different initial candidate network outputs for the same network input.

Using different temperature hyperparameter values can assist in generating candidate network outputs that accurately represent the diverse set of plausible network outputs for a given network input and prevent the amount of "exploration" being considered by the training scheme from decreasing as training progresses, i.e., effectively maintains an exploration-heavy sampling strategy throughout all of training.

Generally, in these implementations, the system selects, each time a given network input is processed through the neural network, a temperature hyperparameter value from a range of possible hyperparameter values, i.e., the range of values between a minimum temperature value and a maximum temperature value. As a particular example, the system can determine a set of equally spaced values within the range and can select a different one of the equally spaced values each time the given network input is processed.

As part of generating the candidate network outputs, the system also determines a respective first likelihood score for each candidate network output.

In particular, the system computes the first likelihood score using probability distributions generated by the neural network when the temperature hyperparameter is set to a predetermined value, e.g., one.

In particular, the first likelihood score is based on the probability assigned to the candidate network output by the neural network, e.g., based on a product of the probabilities assigned to each token in the candidate network output by the corresponding probability distribution that is generated by the neural network.

In other words, the first likelihood score $q_i$ for the i-th training example can be equal to:

$$q_i = \log p(y_i \mid x; \theta_c),$$

where $y_i$ is the candidate network output in the i-th training example, x is the network input in the i-th training example, $\theta_c$ are the current values of the network parameters when the iteration of the process 200 is being performed, and $p(y_i|x; \theta_c)$ represents the probability assigned to $y_i$ by processing x using the neural network in accordance with the current values $\theta_c$ of the network parameters.

When there are multiple tokens in the candidate network output, the probability assigned to the candidate network output is the product of, for each token, the probability assigned to the token by corresponding probability distribution.

Thus, the first likelihood score measures the likelihood that the candidate network output is the "optimal" candidate network output as estimated by the neural network given the current values of the network parameters as of the iteration of the process 200.

The system computes a respective reward value for each candidate network output (step 208).

In particular, the system computes a raw reward value for each candidate network output that characterizes the similarity between the candidate network output and the target network output.

The system can compute the raw reward value using any appropriate reward function for the machine learning task.

For example, for a machine translation task, the reward function can compute the BLEU (BiLingual Evaluation Understudy) score of the candidate network output given the target network output.

As another example, for a text generation task, i.e., for a machine translation task or a different task that requires generating an output text sequence, the reward function can compute the edit distance between the candidate network output and the target network output.

Other reward values for these and other types of tasks, e.g., intersection-over-union measures, are also possible.

Optionally, the system can then compute, from the raw reward value for the candidate network outputs, a respective conditionally normalized reward value for each candidate network output, i.e., can apply conditional reward normalization to the raw reward value.

Generally, normalizing raw rewards before using the rewards for training through reinforcement learning can reduce variance during the training process. However, normalizing raw rewards independently of the corresponding network input can fail to explain a sufficient amount of reward variation, as the difficulty of generating a "good" network output, i.e., a network output with a high raw reward value, is dependent on the intrinsic difficulty of the corresponding network input.

To account for this, the system performs "conditional" reward normalization that is dependent on the corresponding network input. In particular, the system normalizes the raw reward values based only on the raw reward values for candidate network outputs that were generated from the same network input, and not on raw reward values for outputs generated from other network inputs.

For example, the system can compute the mean and standard deviation of the raw reward values for the candidate network outputs generated from the same network input. The system can then generate, for a given candidate network output, the conditionally normalized reward value by standardizing the raw reward value for the given output using the mean and standard deviation, e.g., by subtracting the mean from the raw reward value for the given candidate network output and then dividing the resulting difference by the standard deviation. Thus, each raw reward value is standardized relative to the set of raw reward values generated from the same network input but independently of other raw reward values generated from other network inputs.

The system generates a respective training example for each candidate network output (step 210) that includes (i) the network input, (ii) the candidate network output, and (iii) the reward value for the candidate network output, i.e., either the raw reward value or the conditionally normalized reward value.

The system determines a respective first importance weight factor for each training example (step 212).

When the system trains the neural network on the training example, the system computes an importance weight for the training example using the first importance weight factor and then uses the importance weight to scale the reinforcement learning loss that is computed for the training example. Thus, the importance weight, and, in turn, the first importance weight factor determines how valuable the training example is in updating the neural network.

Determining an importance weight from an importance weight factor and using the importance weight to train the neural network are described in more detail below with reference to FIG. 3.

To determine the first importance weight factor for a given training example, the system uses the first likelihood scores that were computed for the candidate network outputs that were generated from the network input.

In particular, the system computes a measure of central tendency of the first likelihood scores for the candidate network outputs. The measure of central tendency can be the median of the first likelihood scores or a different measure of central tendency, e.g., the mean or the mode of the likelihood scores. The system then uses the measure of central tendency to compute the first importance weight factors for each of the training examples.

More specifically, the system also computes, for each candidate network output, an absolute difference between the first likelihood score for the candidate network output and the measure of central tendency. The absolute difference between two values is the absolute value of the difference between the two values. The system can then compute a measure of central tendency of these absolute differences and compute a standardized absolute deviation l for each candidate network output:

$$l_i = |q_i - \tilde{\mu}_q| / \tilde{\sigma}_q,$$

where $l_i$ is the standardized absolute deviation for the i-th candidate network output, $q_i$ is the first likelihood score for the i-th candidate network output, $\tilde{\mu}$g is the measure of central tendency of the first likelihood scores, and $\tilde{\sigma}$g is the measure of central tendency of the absolute differences.

When the median is used as the measure of central tendency, $l_i$ is the median absolute deviation (MAD) of the first likelihood score for the candidate network output relative to the set of first likelihood scores for the candidate network outputs.

The system then computes the first importance weight factor for each training example from the standardized absolute deviation for the candidate network output in the training example.

More specifically, the first importance weight factor $v_i$ can be equal to:

$$v_i = \exp(-l_i),$$

where $l_i$ is the standardized absolute deviation for the candidate network output in the i-th training example.

Thus, the first importance weight factor $v_i$ encourages continued exploration during training by having the training system pay attention to samples that are "relatively likely" under the current policy (as approximated by the first likelihood scores for the candidate network outputs). The system can operationalize the notion of "relatively likely" as something that is near to the median (or other measure of central tendency) first likelihood score of the candidate network outputs by using the exponentiated negative standardized absolute deviation as in the equation above.

Using the median as the measure of central tendency, e.g., instead of using the mean, can help account for the presence of degenerate candidate outputs that give the distribution of likelihood scores a long tail.

Figure 3:
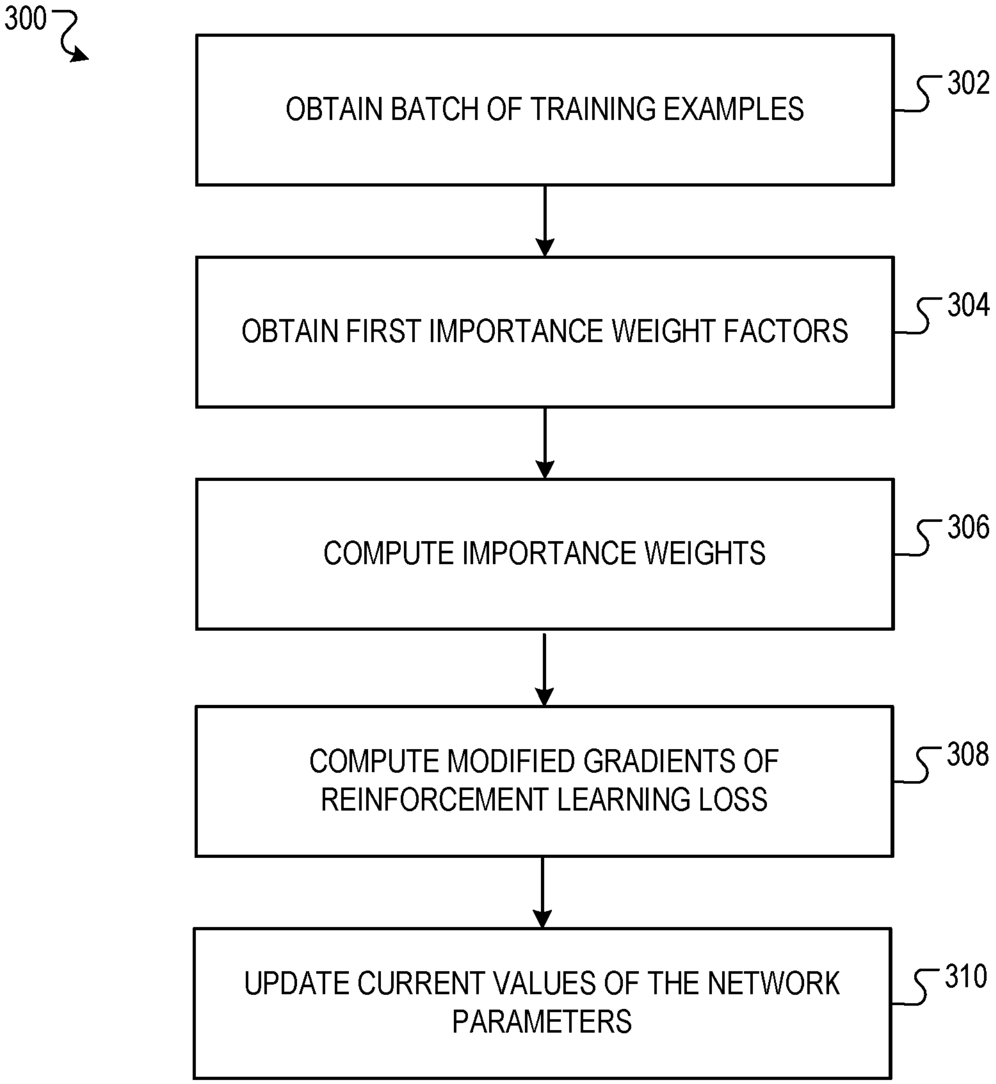
FIG. 3 is a flow diagram of an example process for training the neural network on a set of training examples.

FIG. 3 is a flow diagram of an example process 300 for training the neural network on a set of training examples. For convenience, the process 300 will be described as being performed by a system of one or more computers located in one or more locations. For example, an updating system included in a training system, e.g., the update system 140 included in the training system 100 of FIG. 1, appropriately programmed, can perform the process 300.

The system can repeatedly perform iterations of the process 300 on different batches of training examples to update the values of the parameters of the neural network.

That is, at each iteration of the process 300, the system obtains a batch of one or more training examples, e.g., by sampling the batch from the set of training examples that have been generated by the data generation system(s), and uses the batch of one or more training examples to update the parameters of the neural network.

The system can continue performing iterations of the process 300 until termination criteria for the training of the neural network have been satisfied, e.g., until the parameters have converged, until a threshold amount of wall clock time has elapsed, or until a threshold number of iterations of the process 300 have been performed.

The system obtains a batch of one or more training examples (step 302). Each training example in the batch includes a network input, a candidate network output for the network input, and a reward value for the candidate network output.

As described above, the reward value generally measures the quality of the candidate network output relative to a target network output for the network input. In some implementations, the reward value is a "raw" reward value generated by applying a reward function to the candidate network output and the target network output while in other cases the reward value is a conditionally normalized reward value generated by applying conditional normalization to the raw reward values as described above.

In some implementations, each training example in the batch includes the same network input, i.e., each training example in the batch includes a respective one of a set of multiple candidate network outputs for the same network input. In some other implementations, the training examples in the batch include multiple different network inputs.

The system obtains, for each training example, a respective first importance weight factor (step 304). In some implementations, the respective first importance weight factors for the training examples are pre-computed when the training examples are generated and obtained by the system with the training examples. In some other implementations, the system computes the first importance weight factors using first likelihood scores as described above after sampling the training examples at the current iteration of the process 300.

The system computes, for each training example, an importance weight for the training example using the first importance weight factor for the training example (step 306).

As described above, the importance weight for a training example determines how much weight an update computed for the training example is assigned when updating the parameters of the neural network.

The system can compute the importance weight for the training example from the first importance weight factor using any of a variety of techniques.

As a particular example, the system can set the importance weight for the training example using a set of importance weight factors, with one of the importance weight factors in the set being the first importance weight factor $v_i$.

More specifically, in this example, the set of importance weight factors can also include a second importance weight factor $u_i$ that is based on a difference between a second likelihood score assigned to the training example and the first likelihood score assigned to the training example.

The system can compute the second likelihood score using the neural network in the same way as described above for the first likelihood score, but in accordance with the current values of the network parameters at the time that the iteration of the process 300 is being performed rather than in accordance with the values that were used to generate the training example. That is, because the training example is generated before the training system uses the training example to train the neural network, the current values of the network parameters as of the time that the iteration of the process 300 is being performed may be different from the values of the network parameters that were used to generate the training example.

In other words, the second likelihood score $p_i$ for the i-th training example can be equal to:

$$p_i = \log p(y_i \mid x; \theta),$$

where $y_i$ is the candidate network output in the i-th training example, x is the network input in the i-th training example, θ are the current values of the network parameters when the iteration of the process 300 is being performed, and $p(y_i|x; \theta)$ represents the probability assigned to $y_i$ by processing x using the neural network in accordance with the current values θ of the network parameters.

In particular, the second importance weight factor, $u_i$, can be equal to:

$$u_i = \exp(p_i - q_i),$$

where $p_i$ is the second likelihood score for the i-th training example and $q_i$ is the first likelihood score for the i-th training example.

Thus, the importance weight factor $u_i$ addresses the fact that data is generated from a "stale" policy during training, i.e., that training examples are generated using different values of the network parameters than the current values at the time at which the training examples are used to update the neural network.

The system can use the factors $u_i$ and $v_i$ to compute a candidate importance weight for the training example, e.g., by computing a product of the two factors.

The set of importance weight factors can also include a fixed weight, e.g., 2 or another positive constant weight value, and the importance weight can be set as the minimum between the candidate importance weight and the fixed weight. This ensures that no training example is assigned too high of an importance when updating the neural network.

Thus, the importance weight $w_i$ for the i-th training example can be equal to:

$$w_i = \{u_i * v_i, c\},$$

where c is the positive constant, e.g., 2.

The system computes, for each training example, a modified gradient of a reinforcement learning loss for the training example using the reward for the training example and the importance weight for the training example (step 308).

That is, the system uses the importance weight to modify the gradient of the reinforcement learning loss.

The reinforcement learning loss encourages the neural network to generate network outputs that maximize expected rewards. In other words, the reinforcement learning loss encourages the neural network to assign the highest likelihood scores to network outputs that have the highest expected rewards.

For example, the reinforcement learning loss can be a REINFORCE loss and the loss $L_i$ for the i-th training example can be equal to $$L_i = \overline{r}_i * \log p(y_i \mid x; \theta),$$

where $\overline{r}_i$ is the reward value, e.g., the conditionally normalized reward value, for the i-th training example. In some implementations, the system applies dropout when computing the second term of the loss and the loss is instead expressed as:

$$L_i = \overline{r}_i * \log p(y_i \mid x; \text{dropout}(\theta)).$$

To compute the modified gradient using the importance weight $w_i$, the system can either multiply the loss $L_i$ by the importance weight $w_i$ to generate a modified loss and then compute a gradient of the modified loss with respect to the network parameters, e.g., through backpropagation, or, equivalently, compute a gradient of the loss $L_i$ with respect to the network parameters, e.g., through backpropagation, and then multiply the gradient by the importance weight $w_i$ to generate the modified gradient.

The system updates the current values of the network parameters using the modified gradients for the training examples (step 310). In particular, the system can combine, e.g., average or sum, the modified gradients to determine a combined gradient. The system can then apply an optimizer to the combined gradient and the current values of the parameters to generate updated values of the parameters. For example, the optimizer can be the stochastic gradient descent (SGD) optimizer, the Adam optimizer, the rmsProp optimizer, the Adafactor optimizer, or any other appropriate neural network training optimizer.

Thus, because the importance weight is applied to the gradients as described above, if two training examples have the same gradient, the training example with the higher importance weight will contribute more strongly to the update that will be generated for the values of the network parameters.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for training a neural network that has a plurality of network parameters and that is configured to process a network input in accordance with the network parameters to generate a network output for a machine learning task for the network input, the method comprising:

receiving a first training example that comprises a training network input and a target network output for the training network input;

processing the training network input using the neural network in accordance with first values of the network parameters to generate (i) a plurality of candidate network outputs for the training network input and (ii) for each candidate network output, a respective first likelihood score for the candidate network output that measures a likelihood that the candidate network output is a correct network output for the training network input as estimated by the neural network in accordance with the first values of the network parameters;

for each candidate network output of the plurality of candidate network outputs:

generating a respective reward value for the candidate network output based on (i) the candidate network output and (ii) the target network output for the training network input; and generating a respective second training example for the candidate network output that includes (i) the training network input, (ii) the candidate network output, and (iii) the respective reward value for the candidate network output; and computing a respective first importance weight factor for the candidate network output based on the respective first likelihood scores for the plurality of candidate network outputs;

obtaining one or more third training examples;

obtaining a respective first importance weight factor for each of the third training examples; and training the neural network through reinforcement learning on the third training examples, comprising:

for each third training example, determining an importance weight for the third training example based on the respective first importance weight factor for the third training example;

for each third training example and in accordance with second values of the network parameters, determining a modified gradient of a reinforcement learning loss using the importance weight and the respective reward value; and updating the second values of the network parameters using the modified gradients for the third training examples.

2. The method of claim 1, wherein computing a respective first importance weight factor for the candidate network output based on the respective first likelihood scores for the plurality of candidate network outputs comprises:

determining a standardized absolute deviation for the candidate network output from the respective first likelihood scores for the plurality of candidate network outputs; and computing the respective first importance weight factor for the candidate network output from the standardized absolute deviation.

3. The method of claim 2, wherein computing the respective first importance weight factor for the candidate network output from the standardized absolute deviation comprises:

computing an exponentiation of a negative of the standardized absolute deviation.

4. The method of claim 2, wherein determining a standardized absolute deviation for the candidate network output comprises:

determining a measure of central tendency of the respective first likelihood scores for the plurality of candidate network outputs;

determining, for each candidate network output, an absolute difference between the first likelihood score for the candidate network output and the measure of central tendency;

determining a measure of central tendency of the absolute differences for the candidate network outputs; and computing the standardized absolute deviation for the candidate network output by standardizing the absolute difference for the candidate network output using (i) the measure of central tendency of the respective first likelihood scores and (ii) the measure of central tendency of the absolute differences.

5. The method of claim 4, wherein:

the measure of central tendency of the respective first likelihood scores is a median of the respective first likelihood scores; and the measure of central tendency of the absolute differences is a median of the absolute differences.

6. The method of claim 1, wherein generating a respective reward value for the candidate network output based on (i) the candidate network output and (ii) the target network output for the training network input comprises:

generating a respective raw reward value for the candidate network output by applying a reward function for the machine learning task to (i) the candidate network output and (ii) the target network output for the training network input.

7. The method of claim 6, wherein generating a respective reward value for the network output based on (i) the candidate network output and (ii) the target network output for the training network input comprises:

generating a conditionally normalized reward value for the candidate network output by standardizing the respective raw reward value for the candidate network output using a mean and a standard deviation of the respective raw reward values for the plurality of candidate network outputs.

8. The method of claim 1, wherein processing the training network input using the neural network in accordance with first values of the network parameters to generate a plurality of candidate network outputs for the training network input comprises:

generating each of the plurality of candidate network outputs in accordance with a different value for a temperature hyperparameter.

9. The method of claim 1, wherein determining an importance weight for the third training example based on a respective first importance weight factor for the third training example comprises:

determining a candidate importance weight for the third training example based on the respective first importance weight factor for the third training example and a respective second importance weight factor for the third training example that is generated in accordance with the second values of the network parameters.

10. The method of claim 9, wherein determining the importance weight for the third training example comprises:

processing the training network input in the third particular training example using the neural network in accordance with the second values of the network parameters to generate a respective second likelihood score for the candidate network output in the particular training example; and determining the second importance weight factor based on a difference between the first and second likelihood scores for the third training example.

11. The method of claim 1, wherein the machine learning task is machine translation.

12. A system comprising one or more computers and one or more storage devices storing instructions that when executed by the one or more computers cause the one or more computers to perform operations for training a neural network that has a plurality of network parameters and that is configured to process a network input in accordance with the network parameters to generate a network output for a machine learning task for the network input, the operations comprising:

receiving a first training example that comprises a training network input and a target network output for the training network input;

processing the training network input using the neural network in accordance with first values of the network parameters to generate (i) a plurality of candidate network outputs for the training network input and (ii) for each candidate network output, a respective first likelihood score for the candidate network output that measures a likelihood that the candidate network output is a correct network output for the training network input as estimated by the neural network in accordance with the first values of the network parameters;

for each candidate network output of the plurality of candidate network outputs:

generating a respective reward value for the candidate network output based on (i) the candidate network output and (ii) the target network output for the training network input; and generating a respective second training example for the candidate network output that includes (i) the training network input, (ii) the candidate network output, and (iii) the respective reward value for the candidate network output; and computing a respective first importance weight factor for the candidate network output based on the respective first likelihood scores for the plurality of candidate network outputs;

obtaining one or more third training examples;

obtaining a respective first importance weight factor for each of the third training examples; and training the neural network through reinforcement learning on the particular third examples, comprising:

for each third training example, determining an importance weight for the third training example based on a respective first importance weight factor for the third training example;

for each third training example and in accordance with second values of the network parameters, determining a modified gradient of a reinforcement learning loss using the importance weight and the respective reward value; and updating the second values of the network parameters using the modified gradients for the training examples.

13. The system of claim 12, wherein computing a respective first importance weight factor for the candidate network output based on the respective first likelihood scores for the plurality of candidate network outputs comprises:

determining a standardized absolute deviation for the candidate network output from the respective first likelihood scores for the plurality of candidate network outputs; and computing the respective first importance weight factor for the candidate network output from the standardized absolute deviation.

14. The system of claim 13, wherein computing the respective first importance weight factor for the candidate network output from the standardized absolute deviation comprises:

computing an exponentiation of a negative of the standardized absolute deviation.

15. The system of claim 13, wherein determining a standardized absolute deviation for the candidate network output comprises:

determining a measure of central tendency of the respective first likelihood scores for the plurality of candidate network outputs;

determining, for each candidate network output, an absolute difference between the first likelihood score for the candidate network output and the measure of central tendency;

determining a measure of central tendency of the absolute differences for the candidate network outputs; and computing the standardized absolute deviation for the candidate network output by standardizing the absolute difference for the candidate network output using (i) the measure of central tendency of the respective first likelihood scores and (ii) the measure of central tendency of the absolute differences.

16. The system of claim 15, wherein:

the measure of central tendency of the respective first likelihood scores is a median of the respective first likelihood scores; and the measure of central tendency of the absolute differences is a median of the absolute differences.

17. The system of claim 12, wherein generating a respective reward value for the candidate network output based on (i) the candidate network output and (ii) the target network output for the training network input comprises:

generating a respective raw reward value for the candidate network output by applying a reward function for the machine learning task to (i) the candidate network output and (ii) the target network output for the training network input.

18. The system of claim 17, wherein generating a respective reward value for the network output based on (i) the candidate network output and (ii) the target network output for the training network input comprises:

generating a conditionally normalized reward value for the candidate network output by standardizing the respective raw reward value for the candidate network output using a mean and a standard deviation of the respective raw reward values for the plurality of candidate network outputs.

19. The system of claim 12, wherein processing the training network input using the neural network in accordance with first values of the network parameters to generate a plurality of candidate network outputs for the training network input comprises:

generating each of the plurality of candidate network outputs in accordance with a different value for a temperature hyperparameter.

20. One or more non-transitory computer-readable storage media storing instructions that when executed by one or more computers cause the one or more computers to perform operations for training a neural network that has a plurality of network parameters and that is configured to process a network input in accordance with the network parameters to generate a network output for a machine learning task for the network input, the operations comprising:

receiving a first training example that comprises a training network input and a target network output for the training network input;

processing the training network input using the neural network in accordance with first values of the network parameters to generate (i) a plurality of candidate network outputs for the training network input and (ii) for each candidate network output, a respective first likelihood score for the candidate network output that measures a likelihood that the candidate network output is a correct network output for the training network input as estimated by the neural network in accordance with the first values of the network parameters;

for each candidate network output of the plurality of candidate network outputs:

generating a respective reward value for the candidate network output based on (i) the candidate network output and (ii) the target network output for the training network input; and generating a respective second training example for the candidate network output that includes (i) the training network input, (ii) the candidate network output, and (iii) the respective reward value for the candidate network output; and computing a respective first importance weight factor for the candidate network output based on the respective first likelihood scores for the plurality of candidate network outputs;

obtaining one or more third training examples;

obtaining a respective first importance weight factor for each of the third training examples; and training the neural network through reinforcement learning on the third training examples, comprising:

for each third training example, determining an importance weight for the third training example based on a respective first importance weight factor for the third training example;

for each third training example and in accordance with second values of the network parameters, determining a modified gradient of a reinforcement learning loss using the importance weight and the respective reward value; and updating the second values of the network parameters using the modified gradients for the third training examples.

* * * * *